(12) United States Patent
Masuda

(10) Patent No.: US 8,616,708 B2
(45) Date of Patent: Dec. 31, 2013

(54) FLUORESCENT WHEEL, LIGHT SOURCE DEVICE AND PROJECTOR

(75) Inventor: Hiroki Masuda, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 423 days.

(21) Appl. No.: 12/824,624

(22) Filed: Jun. 28, 2010

(65) Prior Publication Data
US 2010/0328617 A1 Dec. 30, 2010

(30) Foreign Application Priority Data

Jun. 30, 2009 (JP) ................................. 2009-155444

(51) Int. Cl.
*G03B 21/14* (2006.01)

(52) U.S. Cl.
USPC .......................................................... 353/84

(58) Field of Classification Search
USPC ................. 353/31, 84; 359/443, 891; 362/84; 348/743, 800
See application file for complete search history.

(56) References Cited

U.S. PATENT DOCUMENTS

| 5,055,737 | A | 10/1991 | Murata et al. |
| 6,478,431 | B1* | 11/2002 | Sawamura et al. ............. 353/81 |
| 8,093,615 | B2 | 1/2012 | Kim et al. |
| 2005/0186407 | A1 | 8/2005 | Mori et al. |
| 2005/0211991 | A1 | 9/2005 | Mori et al. |
| 2007/0019408 | A1* | 1/2007 | McGuire et al. ............... 362/231 |
| 2007/0230179 | A1* | 10/2007 | Ripoll et al. ................... 362/277 |
| 2008/0094990 | A1* | 4/2008 | Lezhnev et al. ................. 369/94 |
| 2012/0074442 | A1 | 3/2012 | Kim et al. |

FOREIGN PATENT DOCUMENTS

| JP | 2-187742 A | 7/1990 |
| JP | 5-047312 A | 2/1993 |
| JP | 7-37511 A | 2/1995 |
| JP | 2005-277331 A | 10/2005 |
| JP | 2007-208236 A | 8/2007 |
| JP | 2008-166185 A | 7/2008 |

OTHER PUBLICATIONS

Japanese Office Action dated May 6, 2011 (and English translation thereof) in counterpart Japanese Application No. 2009-155444.

* cited by examiner

*Primary Examiner* — Thanh Luu
*Assistant Examiner* — Danell L Owens
(74) *Attorney, Agent, or Firm* — Holtz, Holtz, Goodman & Chick, PC

(57) ABSTRACT

A fluorescent wheel comprising a base with a reflective surface and a flat bottom surface, and a fluorescent layer disposed on the reflective surface of the base such that the reflective surface of the base directs, outward from the wheel, fluorescence emitted from the fluorescent layer due to its excitation by exciting light. The reflective surface of the base has an array of minute reflective structures formed thereon so as to reflect, outward from the reflective surface, fluorescence emitted substantially parallel to the flat bottom surface of the base from the fluorescent layer.

22 Claims, 14 Drawing Sheets

FLUORESCENT WHEEL, LIGHT SOURCE DEVICE AND PROJECTOR

This application is based on Japanese Patent Application No. 2009-155444 filed on Jun. 30, 2009 and including specification, claims, drawings and summary. The disclosure of the above Japanese patent application is incorporated herein by reference in its entirety.

BACKGROUND OF THE INVENTION

1. Field of the Invention

The present invention relates to a fluorescent body device, and more particularly to a fluorescent wheel with a fluorescent layer thereon which is rotated by a motor to emit selected fluorescence due to irradiation of exciting light of a predetermined wavelength, a light source device including the fluorescent wheel, and a projector which includes the light source device and which projects a color image onto a display screen.

2. Description of the Related Art

Recently, in various electronic devices, light sources are used which include a light emitting diode or a laser diode, or emits organic electro-luminescence or fluorescence. The light sources which emits fluorescence increases the density of energy of exciting light to be applied to the fluorescent substances included therein or increases the output of the exciting light to provide light of high luminance. These light sources are used in various fields, for example, of television or illumination applications. Various proposals are made for light sources using fluorescent luminescence in order to provide light of much higher luminance.

In order to increase the energy density or output of the exciting light, it is required to use an exciting light source which consumes a large quantity of electricity or a large-type exciting light source. Thus, these light sources are difficult to be used in electronic devices whose sizes have been reduced recently.

For example, JP H7-37511 proposes a face discharge matrix type plasma display panel where each of unit luminescence areas of the panel is increased by making rugged fluorescent layers covering the outer surfaces of adjacent isolation walls between which the unit luminescence area is defined, thereby increasing its whole luminescent area and luminance.

JP2005-277331 proposes a luminescent device that includes a light emitting device located at a center of a truncated conical recess in a reflector with a remaining space of its conical recess filled with an optically transparent substance containing dispersed fluorescent substances to increase the efficiency of luminescence from the fluorescent layer.

As described above, in order to obtain fluorescence of high luminance in the fluorescent light source, its luminescent area is increased or its fluorescence emitted in every directions is collected and used. However, in the above proposals, most of the fluorescence emitted in directions substantially parallel to the fluorescence emission surface of the fluorescent layer is useless and hence the use efficiency of the fluorescence is low.

Assume that a laser beam of high energy density is used as the exciting light source in a fluorescent wheel which has a reflective flat surface on which the fluorescent layer is provided to emit fluorescence when irradiated with exciting light. In this case, there is a high possibility that coherent light of high energy which has passed through the fluorescent layer and has been reflected by the reflective surface will be emitted as it is outward from the fluorescent wheel.

The present invention is directed to providing a fluorescent wheel of high use efficiency of fluorescence, a high safety light source capable of emitting light of high luminance, and a projector using such light source device.

SUMMARY OF THE INVENTION

In accordance with one aspect of the present invention, there is provided a fluorescent wheel comprising a base with a reflective surface and a flat bottom surface, and a fluorescent layer disposed on the reflective surface of the base such that the reflective surface of the base directs, outward from the wheel, fluorescence emitted from the fluorescent layer due to its excitation by exciting light. The reflective surface of the base has an array of minute reflective structures formed thereon so as to reflect, outward from the reflective surface, fluorescence emitted substantially parallel to the flat bottom surface of the base from the fluorescent layer.

In accordance with another aspect of the present invention, there is provided a light source device comprising a fluorescent wheel that in turn comprises a base with a reflective surface and a flat bottom surface, and a fluorescent layer disposed on the reflective surface of the base; and an exciting light source for exciting the fluorescent layer to cause the reflective surface to emit fluorescence. The base is in the form of a disc with a ring-like groove concentric with the disc at a predetermined position on the disc.

The groove has a bottom of an array of minute reflective structures on which the fluorescent layer is disposed such that the array of minute reflective structures reflects, outward from the reflective surface of the wheel, fluorescence coming in a direction parallel to the flat bottom surface of the disc from the fluorescent layer due to its excitation by the exciting light source. The fluorescent layer comprises red, green and blue wavelength band fluorescent layers that emit red, green and blue wavelength band light, respectively, disposed in order within the ring-like groove on the disc in a peripheral direction of the ring-like groove.

In accordance with still another aspect of the present invention, there is provided a light source device comprising a fluorescent wheel that in turn comprises a base with a reflective surface and a flat bottom surface, and a fluorescent layer disposed on the reflective surface of the base; an exciting light source comprising a blue laser beam generator disposed so as to have an optical axis perpendicular to the flat surface of the fluorescent wheel for applying an exciting blue laser beam to the fluorescent layer, thereby causing same to emit fluorescence; and a dichroic mirror disposed between the exciting light source and the fluorescent wheel so as to allow the light emitted by the exciting light source to pass therethrough and reflect fluorescence emitted from the fluorescent wheel.

The base is in the form of a disc with a ring-like groove concentric with the disc at a predetermined position on the disc. The groove has a bottom of an array of minute reflective structures on which the fluorescent layer is disposed along with a diffusion transmission layer which diffuses light and allowing same to pass therethrough such that the array of minute reflective structures reflects, outward from the reflective surface of the wheel, fluorescence coming in a direction parallel to the flat bottom surface of the disc from the fluorescent layer due to its excitation by the exciting light source. The fluorescent layer comprises red and fluorescent layers that emit red and green wavelength band light, respectively, and a diffusion transmission layer which diffuses light and allows same to pass therethrough, disposed in order within the ring-like groove on the disc in a peripheral direction of the ring-like groove with the diffusion transmission layer disposed also in order along with the red and fluorescent layers within the ring-like groove.

In accordance with another aspect of the present invention, there is provided an image projector comprising a light source device, the light source device in turn comprising a fluorescent wheel that in turn comprises a base with a reflective surface and a flat bottom surface, and a fluorescent layer disposed on the reflective surface of the base; an exciting light source comprising an ultraviolet laser beam generator disposed so as to have an optical axis perpendicular to the flat surface of the fluorescent wheel for applying an exciting ultraviolet laser beam to the fluorescent layer, thereby causing same to emit fluorescence; a dichroic mirror disposed between the exciting light source and the fluorescent wheel so as to allow the light emitted by the exciting light source to pass therethrough and reflect fluorescence emitted from the fluorescent wheel; and a motor for rotating the fluorescent wheel.

The image projector further comprises a display device, an optical source side optical system that guides light emitted from the light source device to the display element, a projection side optical system that projects light from the display element to a display screen, and a projector controller. The base is in the form of a disc with a ring-like groove concentric with the disc at a predetermined position on the disc. The groove has a bottom of an array of minute reflective structures on which the fluorescent layer is disposed such that the array of minute reflective structures reflects, outward from the reflective surface of the wheel, fluorescence coming in a direction parallel to the flat bottom surface of the disc from the fluorescent layer due to its excitation by the exciting light source. The fluorescent layer comprises red, green and blue fluorescent layers that emit red, green and blue wavelength band light, respectively, disposed in order within the ring-like groove on the disc in a peripheral direction of the ring-like groove.

In accordance with a further aspect of the present invention, there is provided an image projector comprising a light source device, the light source device in turn comprising a fluorescent wheel a base with a reflective surface and a flat bottom surface, a fluorescent layer disposed on the reflective surface of the base; an exciting light source comprising an ultraviolet laser beam generator disposed so as to have an optical axis perpendicular to the flat surface of the fluorescent wheel for applying an exciting ultraviolet laser beam to the fluorescent layer, thereby causing same to emit fluorescence; a dichroic mirror disposed between the exciting light source and the fluorescent wheel so as to allow the light emitted by the exciting light source to pass therethrough and reflect fluorescence emitted from the fluorescent wheel; and a motor for rotating the fluorescent wheel.

The image projector further comprises a display device, an optical source side optical system that guides light emitted from the light source device to the display device, and a projection side optical system that projects light from the display element to a display screen, and a projector controller. The base is in the form of a disc with a ring-like groove concentric with the disc at a predetermined position on the disc. The groove has a bottom of an array of minute reflective structures on which the fluorescent layer is provided along with a diffusion transmission layer that diffuses light and allows same to pass therethrough such that the array of minute reflective structures reflects, outward from the reflective surface of the wheel, fluorescence coming in a direction parallel to the flat bottom surface of the disc from the fluorescent layer due to its excitation by the exciting light source.

The fluorescent layer comprises red and green fluorescent layers that emit red and green wavelength band light, respectively, disposed in order within the ring-like groove on the disc in a peripheral direction of the ring-like groove with the diffusion transmission layer disposed also in order along with the red and green fluorescent layers within the ring-like groove.

BRIEF DESCRIPTION OF THE DRAWINGS

The above and other aspects, features, and advantages of the invention will be better understood by reading the following more particular description of the invention, presented in conjunction with the following drawings, wherein.

DETAILED DESCRIPTION OF THE INVENTION

Figure 1A:
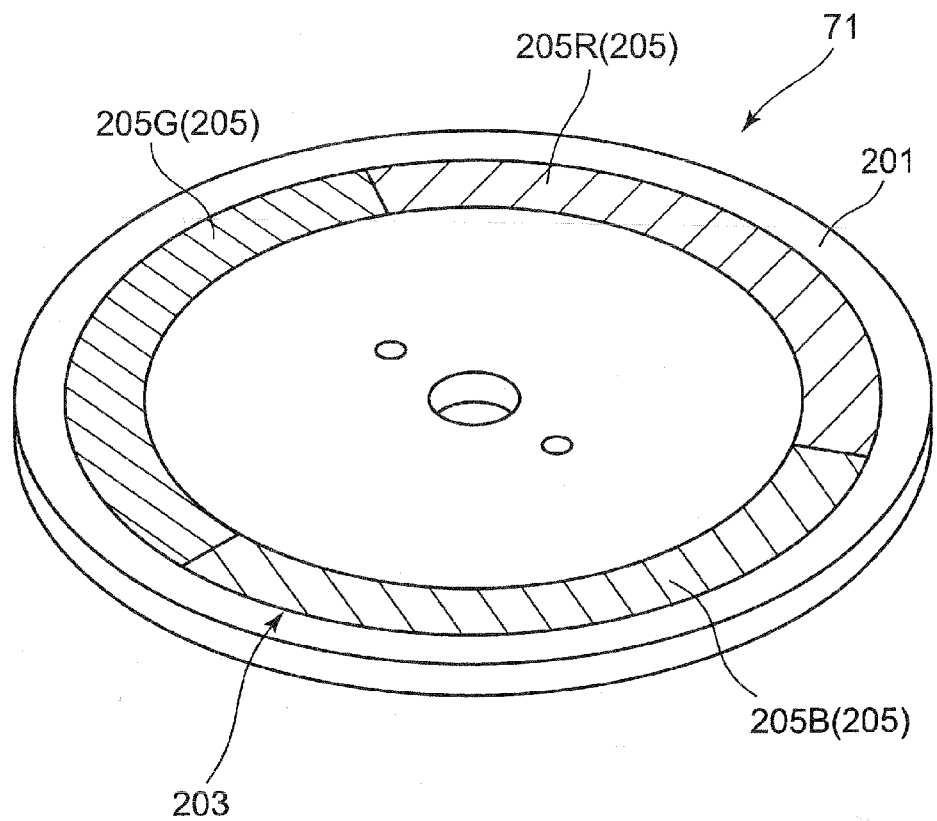
FIG. 1A is a perspective view of a fluorescent wheel according to one example of the present invention.
Figure 1B:
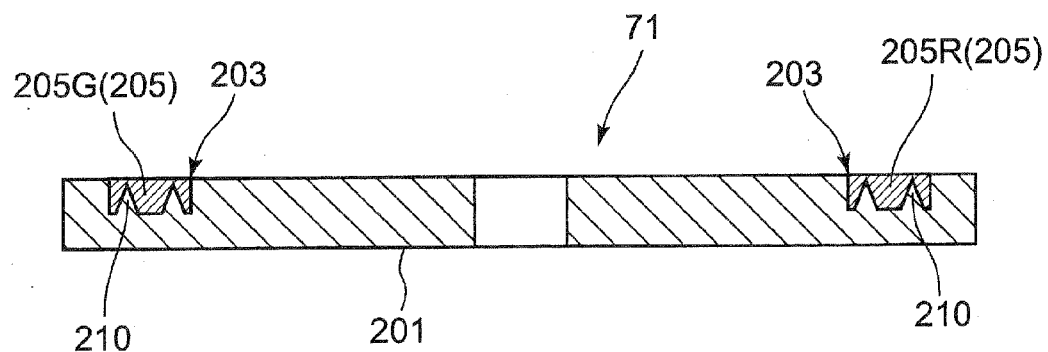
FIG. 1B is a schematic cross-sectional view of the fluorescent wheel.

As shown in FIGS. 1A and B, a fluorescent body device, or more particularly a fluorescent wheel 71, of this embodiment comprises a base disc 201 with a fluorescent layer 205 imbedded within a ring-like groove 203 provided concentric within the base disc close to its outer periphery. When irradiated with exciting light, fluorescent substances 213 contained in the fluorescent layer 205 are excited, thereby emitting fluorescence of a predetermined wavelength band. The fluorescence is directly emitted outward from the outer surface of the fluorescent layer 205 or reflected, for example, by a bottom of the groove 203 and then emitted outward from the outer surface of the fluorescent layer 205.

The base disc 201 is made of a metal material such as silver of high reflectance. The base disc 201 has a central opening through which a rotational shaft 76 (FIG. 11) connects the base disc 201 and a motor 73 (FIGS. 11 and 14) for rotation of the disc. The inner surface of the ring-like groove 203 is worked so as to have a mirror surface by polish or vapor deposition of silver.

The ring-like fluorescent layer 205 is composed of arcuate red, green and blue fluorescent layers 205R, G and B arranged in order within the ring-like groove 203 in its peripheral direction on the base disc 201. The thickness of the fluorescent layer 205 is not greater than 200 μm.

Figure 2:
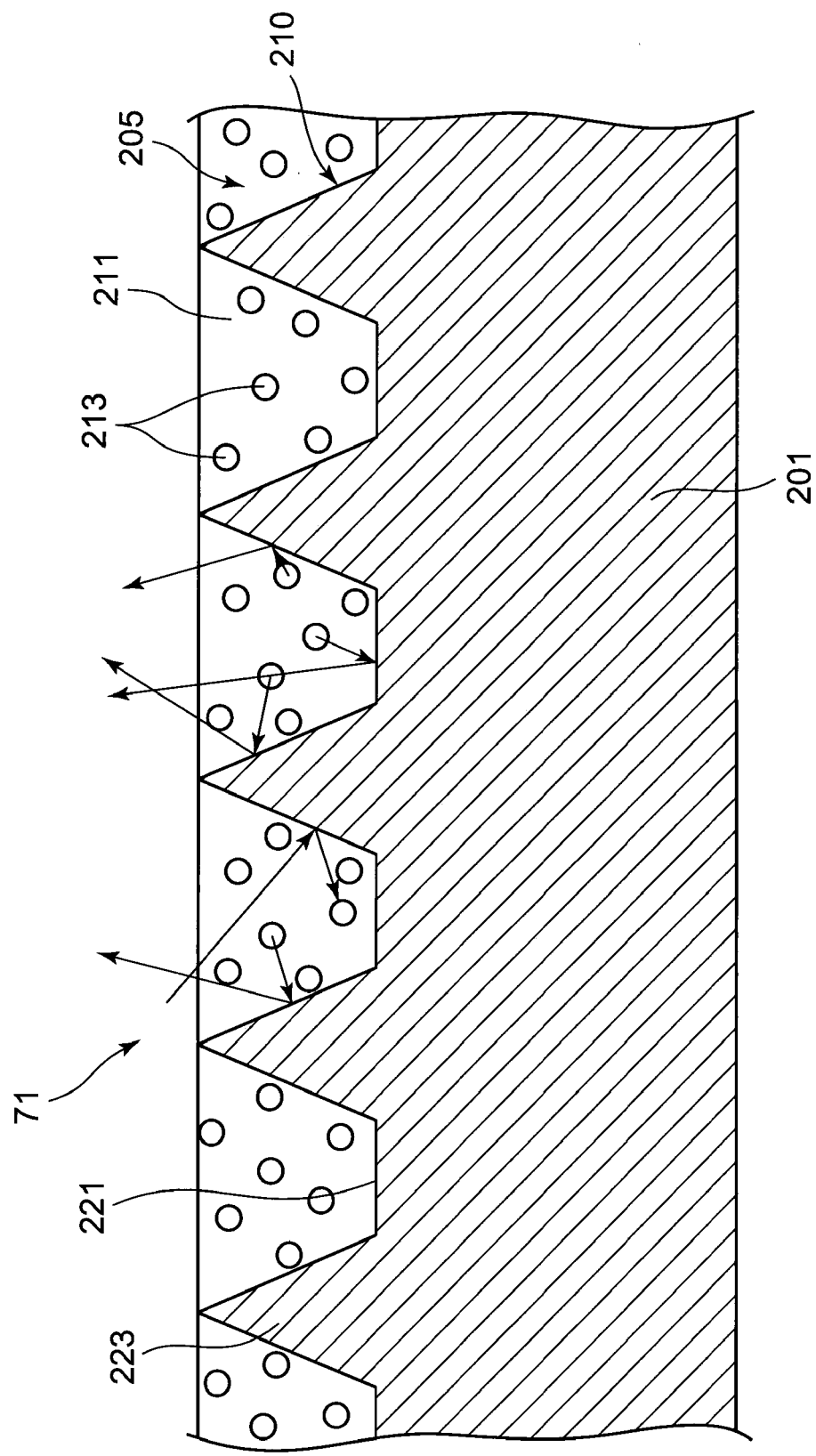
FIG. 2 is an enlarged cross-sectional view of the fluorescent wheel illustrating reflection of light by the fluorescent wheel.

As shown in FIG. 2, these arcuate fluorescent layers 205R, G and B are each formed from the fluorescent substances 213 dispersed in a binder 211, for example, of silicon resin or glass through which visible light is allowed to pass. The red fluorescent substances in the red fluorescent layer 205R may be cadmium borate ($Cd_2B_2O_5$). The green fluorescent substances in the green fluorescent layer 205G may be zinc silicate ($ZnSiO_3$). The blue fluorescent substances in the blue fluorescent layer 205B may be calcium tongstate ($CaWO_4$). The present invention, however, is not limited to these illustrated layer substances.

As shown in FIGS. 1A and B, the features of the fluorescent wheel 71 of this embodiment are that the fluorescent wheel 71 has an array of minute reflective structures 210 on a bottom of the ring-like groove 203. As shown in FIG. 2, fluorescence emitted laterally or substantially parallel to an upper flat surface of the base disc 201 from each fluorescent substance 213 is reflected by the array of minute reflective structures 210 so as to go upward or outward, thereby increasing the use efficiency of the fluorescence.

Figure 3:
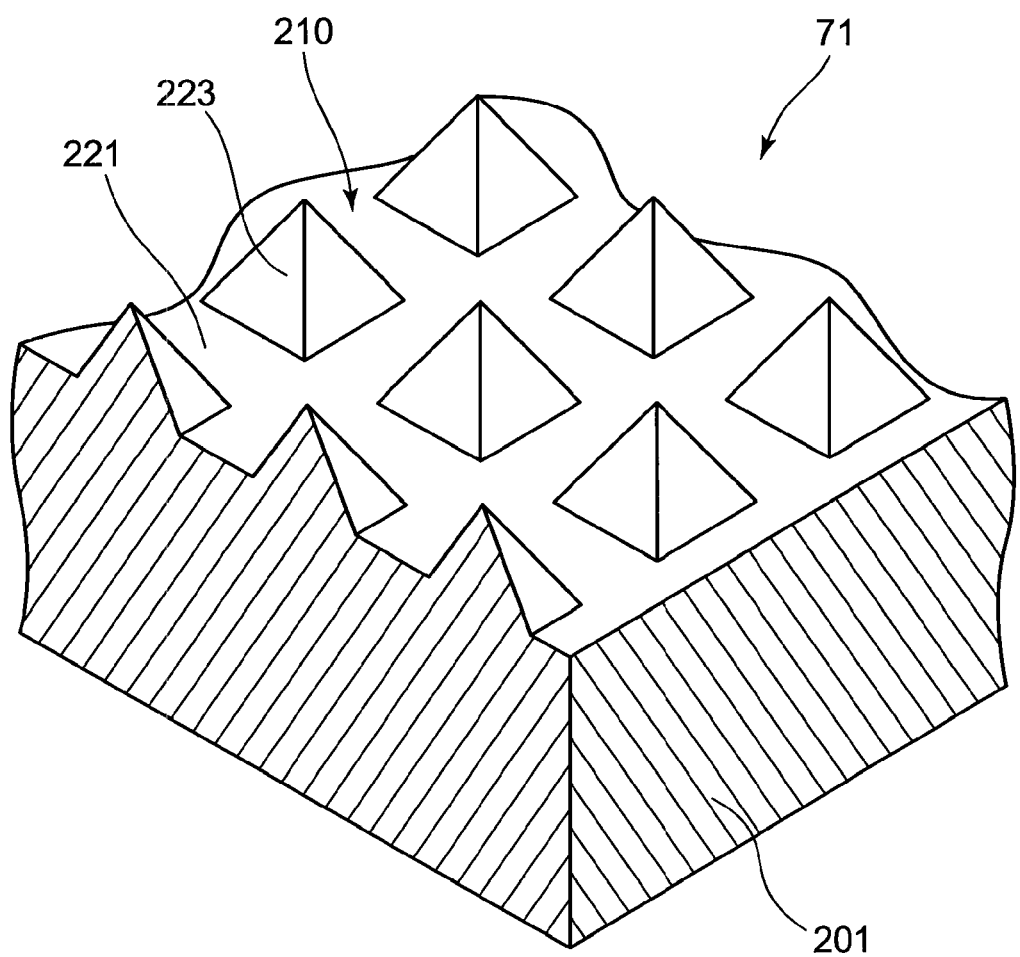
FIG. 3 is a schematic enlarged perspective view of a part of an array of minute reflective structures of the fluorescent wheel.

Now, some examples of the array of minute reflective structures 210 will be described. In an example of FIG. 3, the array 210 comprises a ring-like flat section 221, a plurality of pyramidal projections 223 arranged regularly in rows and columns with a predetermined gap between adjacent projections on the ring-like flat section 221. The gap between adjacent pyramidal projections 223 is preferably in a range of several μm-several mm from a standpoint of workability. The height of each projection 223 is preferably substantially equal in value to the thickness of the fluorescent layer 205, that is, from about several μm to about several hundreds of μm, and more preferably from about scores of 10 μm to about 200 μm. The reflective surface of the array is worked so as to have a mirror surface, and the exciting light entering the fluorescent layer 205 and fluorescence emitted within the fluorescent layer 205 is reflected without being almost attenuated.

As shown in FIG. 2, by the array 210, a part of the light which has entered the fluorescent layer 205 but has not been directly applied to the fluorescent substance 213 is also reflected repeatedly by the projections 223, thereby increasing a possibility of being applied to the fluorescent substances 213. The fluorescence emitted laterally from the fluorescent substances 213 is repeatedly reflected by the sides of the projections 223, thereby increasing the possibility of being emitted outward from the outer surface of the fluorescent layer 205. Thus, the use efficiency of the exciting light and fluorescence is increased. Therefore, without increasing the output and energy density of the exciting light source, fluorescence of high luminance is obtained. Although the projections 223 are illustrated as four-sided pyramidal, they may have another pyramidal shape or a truncated pyramidal shape to provide similar advantages.

Figure 4:
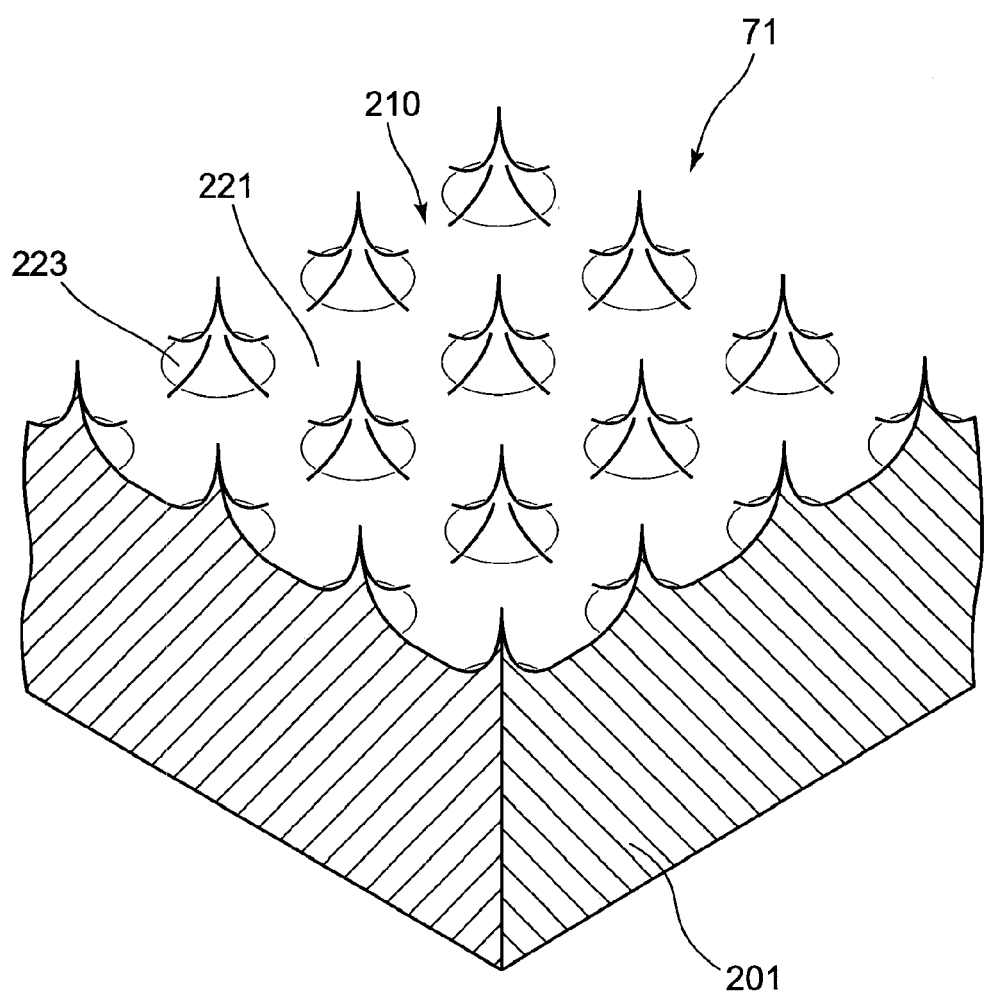
FIG. 4 is a view similar to FIG. 3 showing anther example of the fluorescent wheel.

As shown in FIG. 4, in one example, the array 210 may have a plurality of projections 223 disposed regularly at predetermined intervals in rows and columns, each projection having a side, which is obtained by rotating a part of parabola between its central symmetrical axis and a second axis parallel to the central symmetrical axis around the second axis such that the side reflects light from the focal point of the parabola so as to be parallel rays of light. Thus, even fluorescence different from that emitted from the focal point may be reflected outward substantially perpendicular to and from the outer surface of the fluorescent layer 205. Thus, the angles of dispersion of the fluorescence emitted from the fluorescent layer are reduced, thereby increasing the use efficiency of the fluorescence. Although the projections 223 are illustrated as having the above-mentioned unique side shape, they may be in substantially the form of a pyramid or a truncated-pyramid with a parabolic side.

Figure 5:
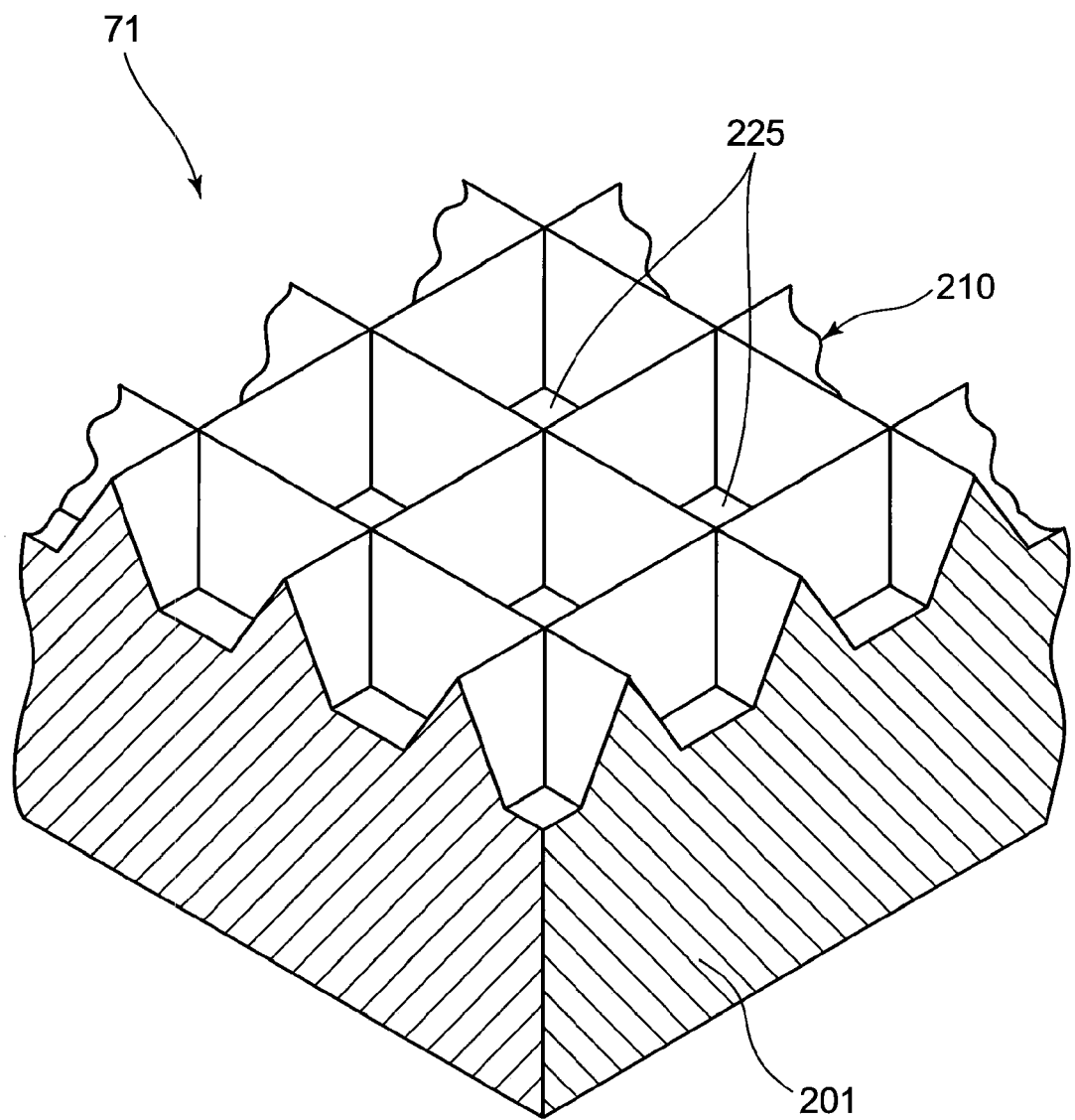
FIG. 5 is a view similar to FIG. 3 showing still another example of the fluorescent wheel.

As shown in FIG. 5, in one example, the array 210 may have a lattice-like array of inverted truncated pyramid-shaped recesses 225. By such structure, the fluorescence emitted laterally from the fluorescent substances 213 is reflected by the inclined inner sides of the respective recesses 225, thereby going outward from the outer surface of the fluorescent layer. Thus, laterally passing part of the fluorescence which has not been used in the past is reflected and emitted outward as effective light, thereby increasing the use efficiency of the fluorescence. Part of the exciting light emitted from the exciting light source is also repeatedly reflected by the sides of the respective recesses 225. Thus; the possibility of being applied to the fluorescent substances 213 is increased, thereby increasing the use efficiency of the exciting light. The array of reflective structures is not limited to the array of inverse truncated four-sided pyramidal shaped recesses of FIG. 5, but may be an array of inverse truncated pyramid shaped recesses with a different number of sides.

Figure 6:
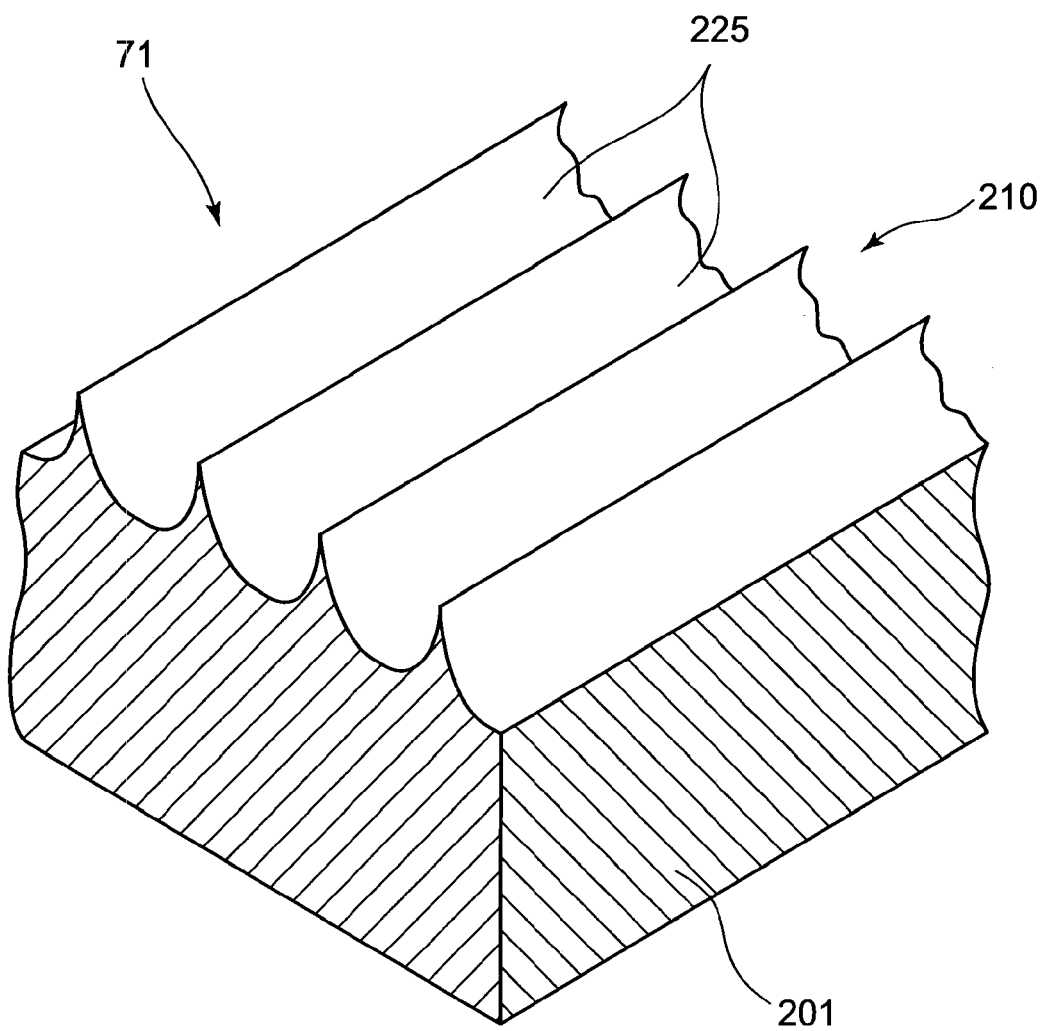
FIG. 6 is a view similar to FIG. 3 for a further modification of the fluorescent wheel.
Figure 7:
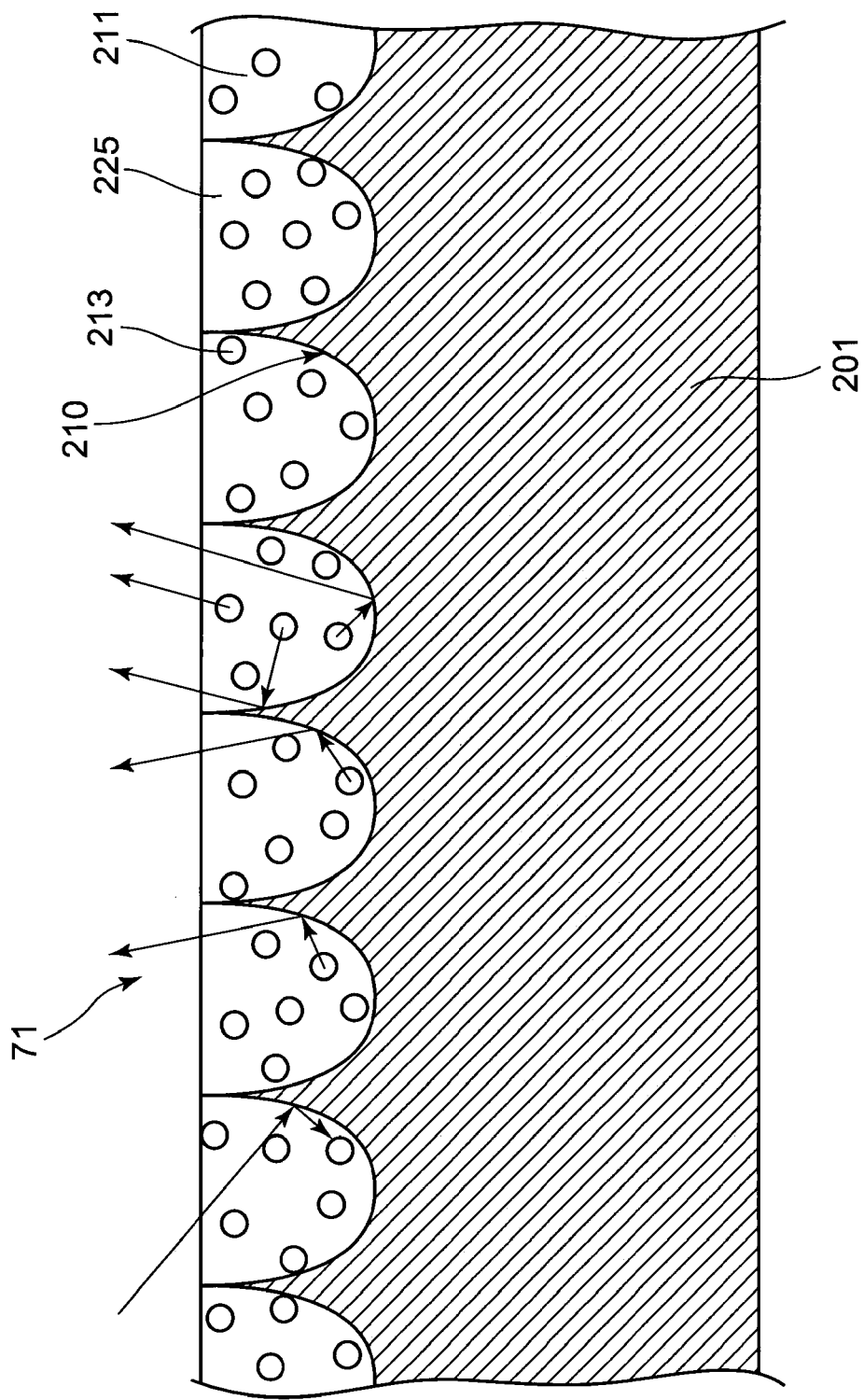
FIG. 7 is a schematic cross-sectional view of the fluorescent wheel of FIG. 6, illustrating reflection of fluorescence.

As shown in FIG. 6, in one example, the array 210 may have a plurality of parabolic-shaped recesses 225 extending radially of the disc 201 arranged in order within the ring-like groove 203 in its peripheral direction on the disc 201, each recess having a parabolic cross-section. Even in this structure, as shown in FIG. 7, fluorescence emitted laterally from the fluorescent substances 213 is reflected by the inner parabolic surface of the respective recesses 225, thereby going outward from the outer surface of the disc 71. A part of the light beam entering the fluorescent layer 205 is also repeatedly reflected by the inner parabolic surface of the associated recess, and the possibility of being applied to the fluorescent substances 213 is increased. Thus, useless exciting light emitted outward without being applied to the fluorescent substances 213 is reduced. Thus, like the above mentioned embodiment and modifications, the use efficiency of the fluorescence and exciting light is improved.

Figure 8:
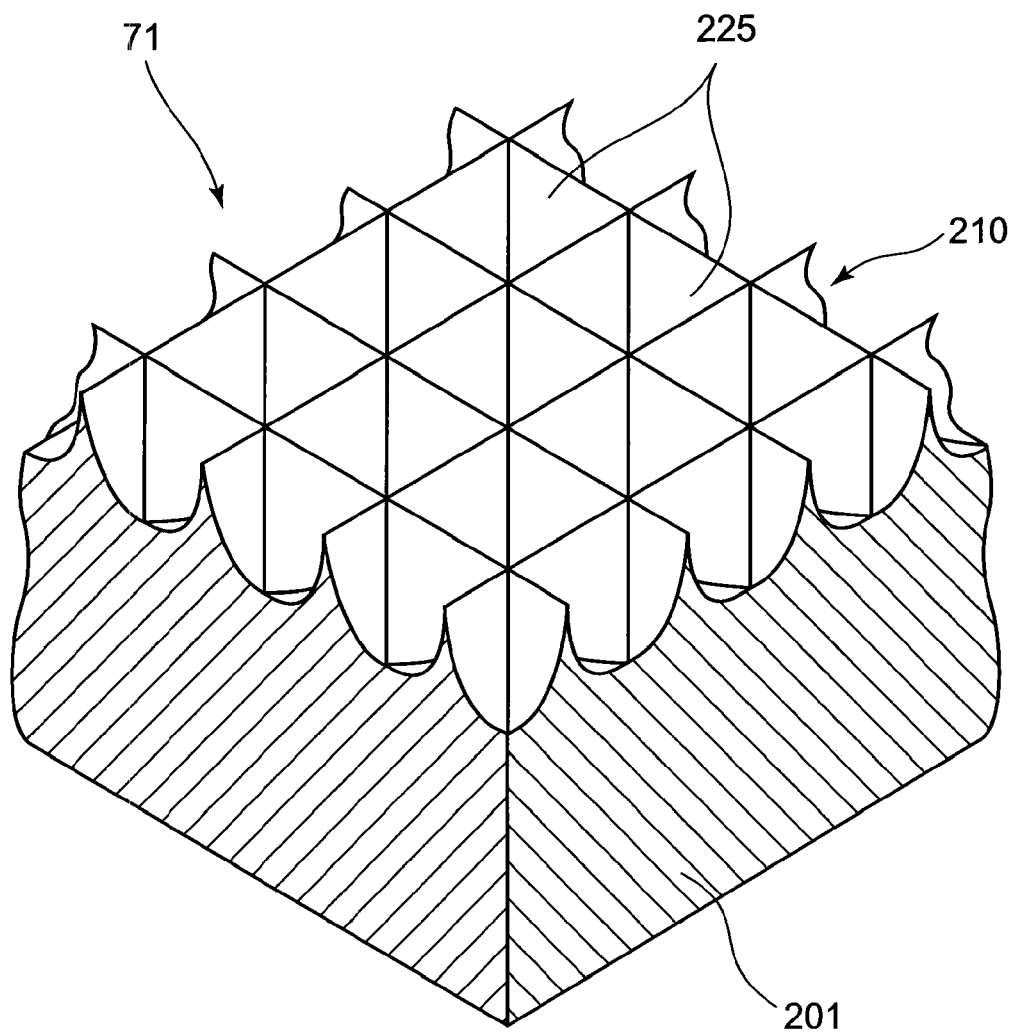
FIG. 8 is a view similar to FIG. 3 showing an example of the fluorescent wheel.

As shown by one example in FIG. 8, the array 210 may include a plurality of recesses 225 regularly in rows and columns each recess including a pair of inner parabolic surfaces arranged at 90 degrees to each other around a common central symmetrical axis. This array of structures also provides advantages mentioned above with reference to the above-mentioned examples.

Figure 9:
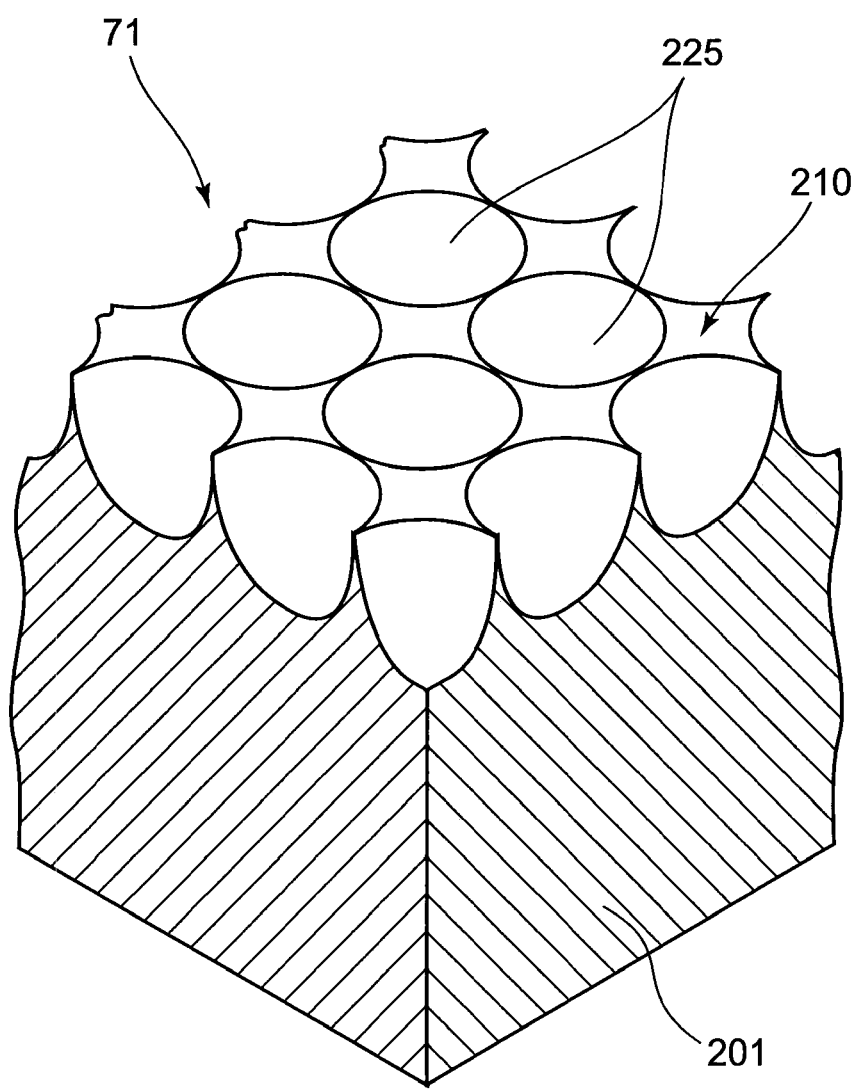
FIG. 9 is a view similar to FIG. 3 for another example of the fluorescent wheel.

In addition, as shown by one example in FIG. 9, the array 210 may include a plurality of recesses (or recessed reflectors) 225 arranged regularly in rows and columns, each recess or recessed reflector having the shape of a paraboloid of revolution. This structure also provides advantages mentioned above with reference to the above-mentioned examples.

In one example, the array 210 may have a plurality of protrusions or recesses arranged regularly in rows and columns each protrusion or recess having the shape of a semi-ellipsoid.

In order to produce such array 210, laser beam working or electric casting may be used. In addition, a reflective surface structure 210 may be produced, which includes a thin reflective film formed on the inner surface of the ring-like groove 203 on the base 201, using a technique such as micro-contact printing.

Although the fluorescent wheel 71 is illustrated as being disc-shaped, it is not limited to the one so shaped, but may be of a square base whose partial or whole surface comprises an array of minute reflective structures. Alternatively, the fluorescent wheel 71 may have such array of minute reflective structures 210, for example, in a square recess and not within the ring-like groove on the base 201 although various designs are possible as required. The fluorescent wheel 71 is not necessarily required to have all the red, green and blue fluorescent layers 205. It may be include a white light layer only.

According to the fluorescent wheel 71, the base 201 has the array of minute reflective structures 210. Thus, fluorescence emitted substantially parallel to the direction of the upper flat surface of the base 201 from fluorescent substance 213 and not used effectively in the conventional fluorescent wheel is usable as effective light. Thus, the use efficiency of the fluorescence is improved. In addition, in a light source device, a fluorescent wheel 71 is capable of outputting light of high luminance without increasing the energy density and output of the exciting light.

According to the fluorescent wheel 71, a possibility that the exciting light entering the fluorescent layer 205 will also be applied by the array of minute reflective structures 210 to the fluorescent substances 213 contained in the fluorescent layer 205 is increased, thereby improving the use efficiency of the exciting light.

The protrusions 223 are flush with the fluorescent layer 205. Thus, the possibility will increase that the fluorescence and exciting light within the fluorescent layer 205 is reflected by the array of minute reflective structures 210. Therefore, the use efficiency of the fluorescence and exciting light is improved.

If the base 201 is made of a material of high reflectance, an attenuation rate of the exciting light and fluorescence applied to the basae 201 is decreased. Thus, the use efficiency of the exciting light and fluorescence is increased. Similar advantages are achieved by vapor-deposition of a metal film of high reflectance on the reflective surface of the base 201 and working the metal film so as to form a mirror surface.

Each of the fluorescent wheels 71 mentioned above can be used as a light source device for a projector.

Fluorescence of red, green and blue wavelength bands is produced by the arcuate red, green and blue fluorescent layers 205R, G and B arranged within the ring-like groove in its peripheral direction on the fluorescent wheel. Thus, this wheel is usable in various electronic devices.

Figure 10:
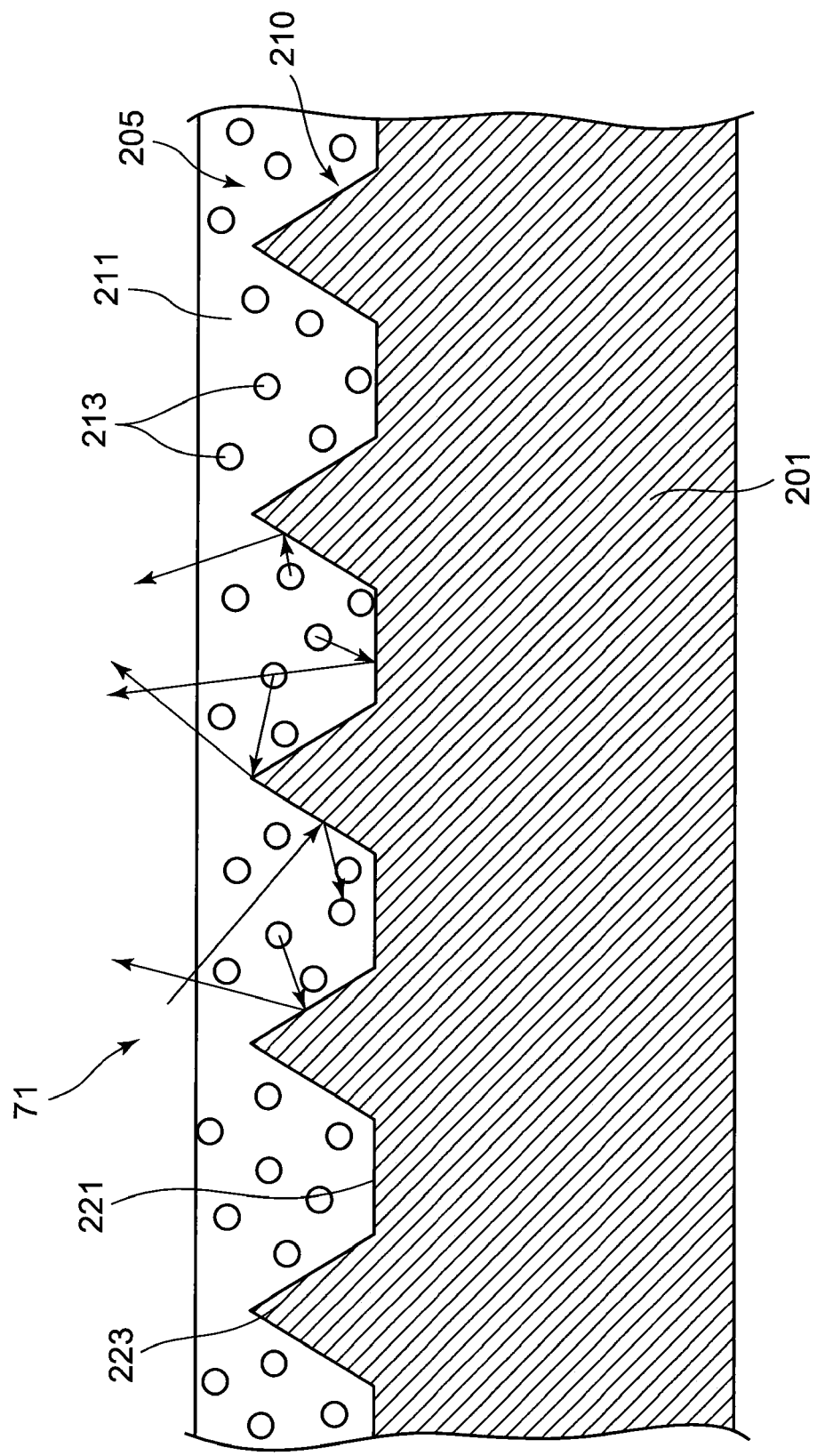
FIG. 10 is a view similar to FIG. 2 for still another example of the fluorescent wheel.

As shown in FIG. 10, in one example, the height of the reflective projections 210 may be smaller in value than the maximum thickness of the fluorescent layer 205. This increases an amount of the fluorescent substances 213 coatable on the fluorescent layer 205, thereby increasing a quantity of fluorescence emitted from the wheel 71.

Figure 11:
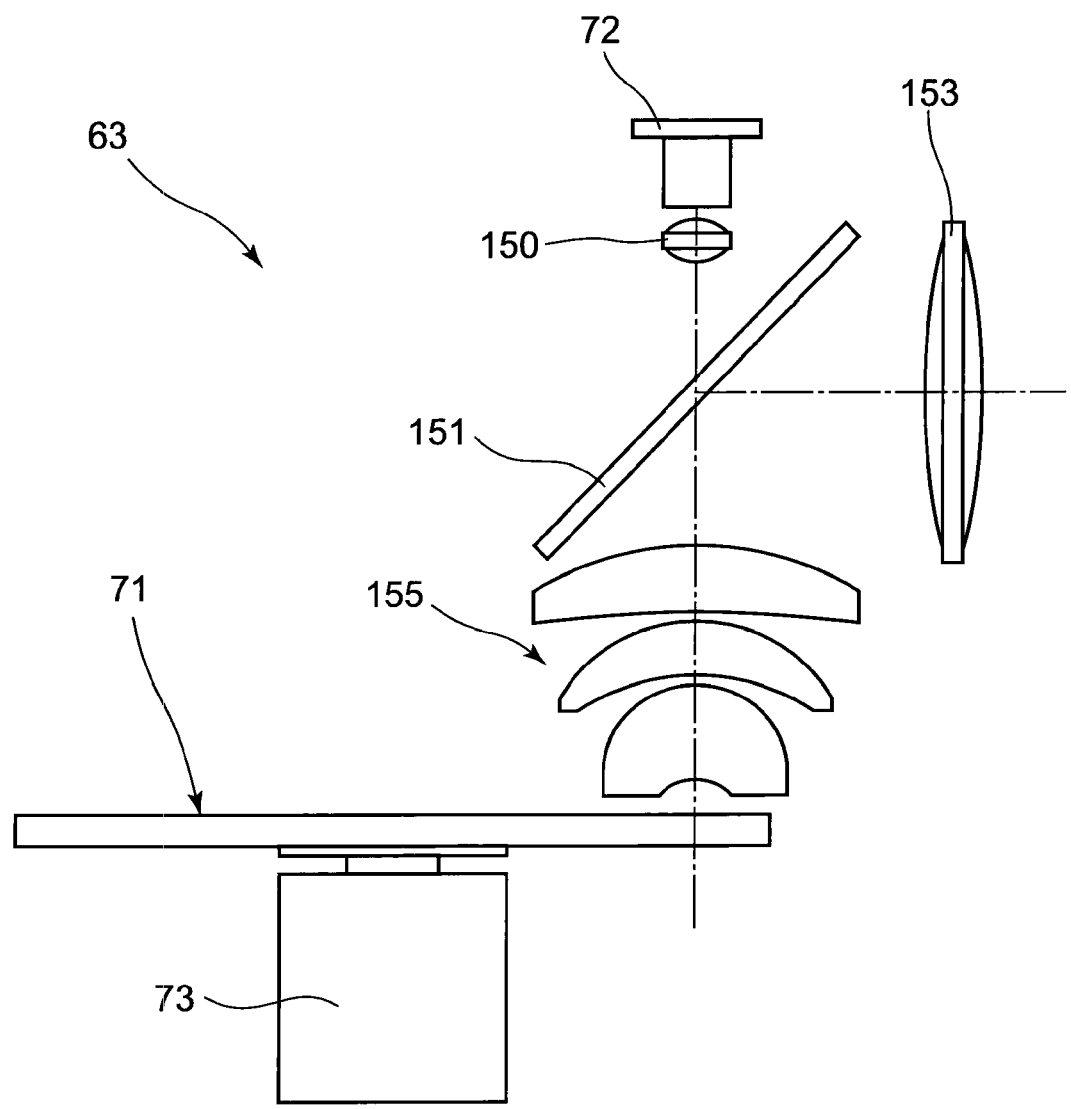
FIG. 11 is a schematic plan view of a light source device according to one example of the present invention.

Referring to FIG. 11, a light source device 63 will be described. The light source device 63 includes the exciting light source 72, the fluorescent wheel 71 which receives fluorescence emitted by the exciting light source 72 and which emits red, green and blue fluorescence in a predetermined direction, and a motor 73 which drives the wheel 71. In this light source device 63, a collimator lens 150 is disposed in front of the exciting light source 72. A light condensing optical system which includes a focusing lens group 155, and a dichroic mirror 151 associated with a convex lens 153 is arranged between the fluorescence emitting side of the wheel 71 and the collimator lens 150.

The exciting light source 72 comprises a laser beam emitter including, for example, an ultraviolet laser diode which emits a laser beam which excites the fluorescent substances 213 contained within the binder 211. The exciting light source 72 has an optical axis perpendicular to a flat surface of the wheel 71, or parallel to a rotational axis of the wheel 71. The exciting light source 72 is not necessarily required to use the ultraviolet laser beam emitter but may use an ultraviolet beam emitting diode. Alternatively, the arrangement may be such that the fluorescent wheel 71 comprise red and green fluorescent layers and a diffusion transparent layer of frosted glass arranged within the ring-like groove in its peripheral direction on the disc and that the exciting light source 72 comprises a blue laser beam emitter or a blue light emitting diode.

The dichroic mirror 151 reflects fluorescence from the fluorescent wheel 71 in a direction of 90 degrees to an optical axis of light source 72 and allows light emitted from the exciting light source 72 to pass therethrough.

The condensing lens group 155 is disposed close to the fluorescence emitting surface of the wheel 71 on the side of the exciting light source 72. The condensing lens group 155 condenses exciting light from the light source 72, applies resulting light to the wheel 71, also condenses the fluorescence emitted from the wheel 71 and then applies it to the dichroic mirror 151. Light emitted from the exciting light source 72 is condensed by the collimator lens 150 and the condensing lens group 155 as a light beam having a substantially circular cross-section on the fluorescent layer 205 provided on the wheel 71.

The convex lens 153 is disposed laterally of the dichroic mirror 151, or on an optical axis of the fluorescence reflected by the dichotic mirror 151. The convex lens 153 condenses a light beam reflected by the dichroic mirror 151 and emits it as light outward from the light source 63.

According to the light source device 63 of this embodiment, the use of the fluorescent wheel 71 with the array of minute reflective structures 210 improves the use efficiency of the exciting light and fluorescence, thereby providing luminescence of high luminance.

This light source device 63 provides fluorescence of three primary colors; red, green and blue, and is usable in various electronic and electric devices. The presence of the dichroic mirror 151 prevents the exciting light comprising coherent light from being emitted outward from the light source device 63. Thus, the light source 63 of high safety is provided.

According to the light source device 63, high luminance light of wavelength bands of three primary colors; red, green and blue, is provided by the fluorescent wheel 71 with the red, green and blue fluorescent layers 205 arranged in order within the ring-like groove provided on the wheel 71 whose bottom comprises the array of minute reflective structures 210.

Figure 12:
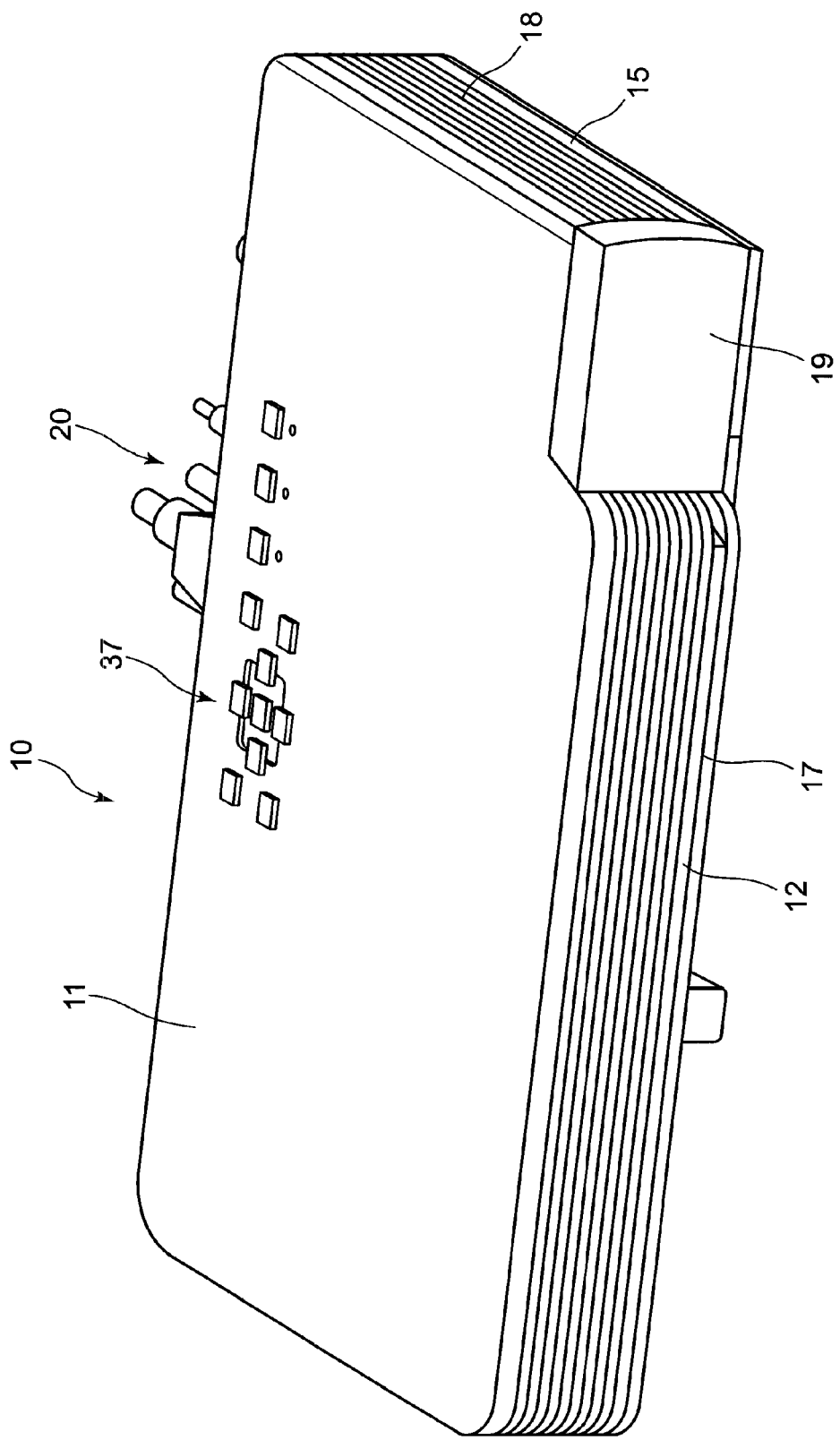
FIG. 12 is a perspective view of a projector using the light source device according to one example of the present invention.

Then, referring to FIG. 12, a projector 10 including such light source device 63 as one embodiment of the present invention will be described. The projector 10 has a substantially cuboidal housing whose front has a lens cover 19 which covers a light projection exit aperture (not shown), at the right end of a front panel 12 of the housing. The front panel 12 has a plurality of vents 17. The projector 10 also comprises an infrared ray (IR) receiver 35 (FIG. 13) which receives a control signal from a remote controller (not shown).

Provided on a top panel 11 of the housing is a key/indicator 37 which includes a power source switch, a power indicator informing of turning on/off of the power source and its switch key, a projection switch which changes turning on/off of image projection, and an overheat indicator which indicates overheating of the light source device, display device and controller circuit.

Provided on a back panel of the housing are terminals 20 including terminals for a power source adapter; and USB terminals, D-SUB, S and RCA terminals of an input/output connector for reception of image signals. The right and left side panels (only the right side panel 15 is shown in FIG. 12) have a plurality of intakes 18 in the vicinity of lower ends thereof.

Figure 13:
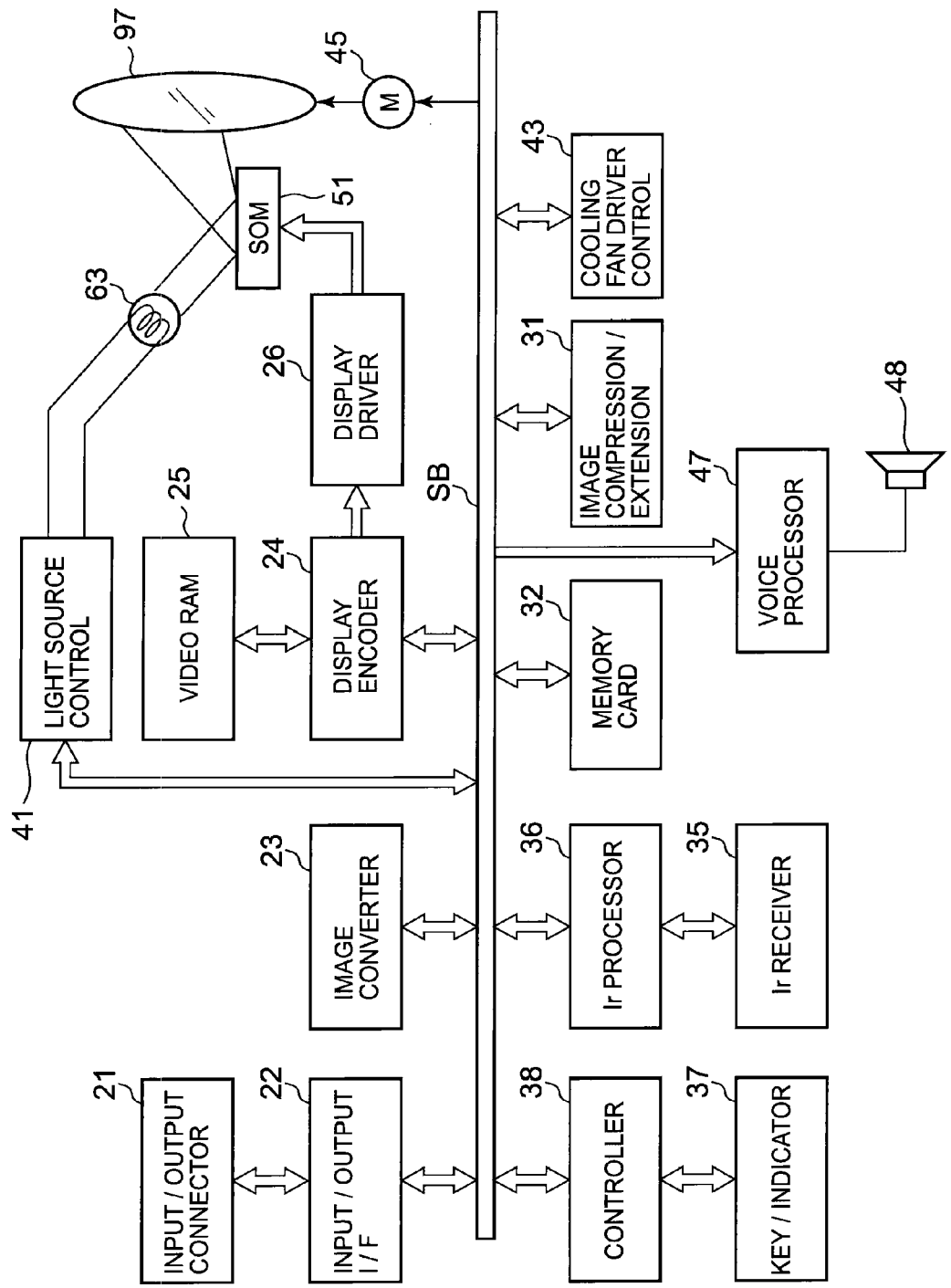
FIG. 13 is a functional circuit block diagram of the projector.

Referring to FIG. 13, a control mechanism of the projector 10 comprises a controller 38, an input/output interface 22, an image converter 23, a display encoder 24 and a display driver 26. Image signals conforming to various standards received from the input/output connector 21 are forwarded via the input/output interface 22 and a system bus SB to the image converter 23, which then converts the respective received image signals to image signals of a predetermined format appropriate to be displayed and then outputted to the display encoder 24.

The display encoder 24 loads and stores the received image signal on a video RAM 25 and produces a video signal from the image signal stored on the video RAM 25 and outputs a resulting signal to the display driver 26.

The display driver 26 drives a display element 51, which includes a spatial optical modulator (SOM) at an appropriate frame rate in accordance with the image signals received from the display encoder 24. By applying a light beam emitted by the light source device 63 to the display element 51 via the optical source side optical system, resulting reflected light beam from the display element 51 forms an optical image, which is then projected and displayed onto a display screen (not shown) via a projection lens group of a projection side optical system. A movable-lens group 97 of the projection side optical system is driven by the lens motor 45 to adjust the zooming/focusing operations.

An image compression/extension unit 31 compresses a luminance signal and color difference signals of the image signal by ADCT and Huffman encoding and then sequentially writes resulting data to a removable memory card 32. The image compression/extension unit 31 reads image data recorded on the memory card 32 in a reproduce mode, extends a series of individual image data composing a moving image in units of one frame, outputs resulting image data to the display encoder 24 via the image converter 23, and displays a moving image on the display screen based on the image data stored on the memory card 32.

The controller 38 controls operation of the respective circuits of projector 10, and is composed of a CPU, a ROM which permanently stores operation programs for various setting processes, and a RAM for use as a working memory.

Operation signals from the key/indicator unit 37, composed of the main key and indicators, provided on the top panel 11 of the housing are sent directly to the controller 38. A keyed-in signal from the remote controller is received by the infrared receiver 35, and demodulated by the infrared processor 36, and then a resulting signal is outputted to the controller 38.

The controller 38 is connected via a system bus SB to a voice processor 47, which comprises a sound source circuit including a PCM sound source. The voice processor 47 converts voice data to analog data in the project and reproduce modes, and drives a speaker 48 to emit a corresponding audible sound.

The controller 38 controls the light source control circuit 41 which in turn controls the light source device 63 such that light of a predetermined wavelength band required in the image production is emitted by the light source device 63. More specifically, when light of the red wavelength band is required, the wheel motor 73 is controlled so as to position the red fluorescent layer 205R on an optical axis of the exciting light source 72. Also, when light of green or blue wavelength band is required, the wheel motor 73 is controlled in a similar manner.

Further, the controller 38 controls the cooling fan driver control circuit 43 so as to cause a plurality of temperature sensors provided on the light source device 63 to sense its temperature, thereby controlling the rotational speed of the cooling fans based on a result of the temperature sensing. The controller 38 also controls the fan drive control circuit 43 to cause the cooling fan to continue rotate, for example, using a timer, also after the power source of the projector is turned off, or otherwise turn off the power source of the projector depending on a result of temperature sensing of the light source.

Figure 14:
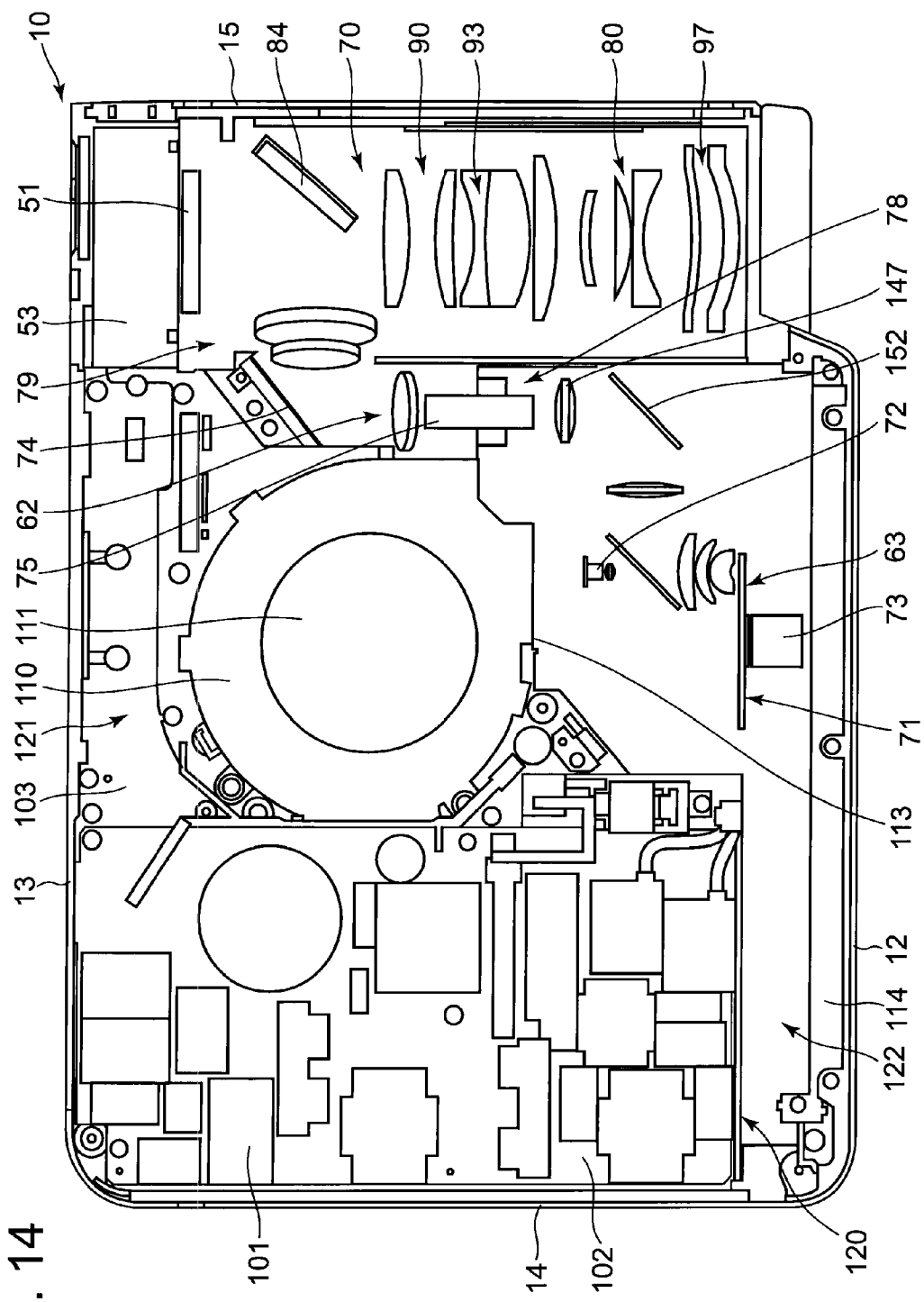
FIG. 14 is a schematic plan view of an internal structure of the projector.

Referring to FIG. 14, the internal structure of the projector 10 will be described. In this projector 10, a power source control circuit board 102 with a power source circuit block 101 attached thereto is disposed in the vicinity of a right side panel 14. A sirocco fan type blower 110 is disposed at substantially the center of the projector 10. A control circuit board 103 is disposed in the vicinity of the blower 110. The light source device 63 is disposed in the vicinity of the front panel 12, and an optical system unit 70 is disposed in the vicinity of the right side panel 15.

The housing of the projector 10 is divided airtightly by a partition 120 into an intake side chamber 121 on the side of the back panel 13, and an exhaust air side chamber 122 on the side of the front panel 12. A blower 110 is disposed such that its intake port 111 is located within the chamber 121 and its discharge port 113 is located between the intake and exhaust chambers 121 and 122.

The optical system unit 70 comprises an illumination side block 78 located in the vicinity of the light source device 63, an image production block 79 located on the side of the back panel 13 and a projection side block 80 located between the illumination side block 73 and the right side panel 15 arranged in a substantially U-shape.

The illumination side block 78 comprises the light source side optical system 62 which guides light emitted by the light source device 63 to the display element 51 of the image production block 79. The light source side optical system 62 includes a light guiding device 75 which converts light emitted by the light source device 63 to a light beam of even strength distribution and a light condensing lens 148 which condenses light passing through the light guiding device 75.

The image production block 79 comprises the light source side optimal system 62 which in turn comprises an optical axis altering mirror 74 which alters the direction of the optical axis of a light beam emitted by the light guiding device 75, a light condensing lens group 76 which condenses the light reflected by the optical axis changing mirror 74 onto the display element 51, and a mirror 84 which irradiates the display element 51 with a light beam, which has passed through the light condensing lens group, at a predetermined angle to the display element 51. The image production block 79 also comprises a DMD (Digital Micromirror Device) which is the display element 51 with a cooler 53, which cools the display element 51, disposed on the side of the back panel 13 of the display element 51 for cooling same.

The projection side block 80 comprises a lens group of a projection side optical system 90 which emits image light reflected by the display element 51 onto the display screen. The projection side optical system 90 is a variable focus type lens including a fixed lens group 93 contained within a fixed lens barrel and a movable lens group 97 contained within a movable barrel, thereby providing a variable focus type lens having a zooming function. Thus, the movable lens group 97 is moved by the lens motor 45 to adjust the zooming and/or focusing operations.

The light source device 63 of the projector 10 of this embodiment comprises the fluorescent wheel 71 which in turn comprises the array of minute reflective structures 210. The reflector 152 is disposed on the optical path of light from the light source device 63 altered 90 degrees by the dichroic mirror 151 to alter the optical path of the light from the dichroic mirror so as to coincide with that of the light guiding device 75. A light guiding device incident lens 147 is disposed in front of the reflector 152 so as to condenses light from the light source onto a light incident surface of the light guiding device 75.

Since the light source device 63 is small in size and capable of emitting light of high luminance, the projector 10 itself is also small in size and thin in thickness.

Various modifications and changes may be made thereunto without departing from the broad spirit and scope of this invention. The above-described embodiments and examples are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A fluorescent substrate comprising:
a base having a reflective surface; and
a fluorescent layer formed by disposing a fluorescent substance on the reflective surface of the base;
wherein fluorescence emitted from the fluorescent substance due to its excitation by exciting light is emitted from a side of the base on which the fluorescent substance is disposed;
wherein the reflective surface of the base has a minute reflective structure formed thereon such that fluorescence emitted in a flat direction of the base from the fluorescent layer is emitted outward, in a direction intersecting the flat direction, from the side of the base on which the fluorescent substance is disposed;
wherein the minute reflective structure comprises a flat section and a plurality of projections projecting from the flat section;
wherein the base is a fluorescent wheel which is in the form of a disc, at a predetermined position on which a ring-like groove is formed, wherein the minute reflective structure is formed on a bottom face of the ring-like groove, and wherein the fluorescent layer is deposited within the ring-like groove; and
wherein a side surface of each of the projections is paraboloid-shaped.

2. The fluorescent substrate of claim 1, wherein a height of each projection in the minute reflective structure is equal in value to a thickness of the fluorescent layer.

3. The fluorescent substrate of claim 1, wherein a height of each projection in the minute reflective structure is smaller in value than a thickness of the fluorescent layer.

4. The fluorescent substrate of claim 1, wherein a red fluorescent layer that emits red wavelength band light, a green fluorescent layer that emits green wavelength band light, and a blue fluorescent layer that emits blue wavelength band light are disposed in order within the ring-like groove in a peripheral direction.

5. A light source device comprising an exciting light source and the fluorescent substrate of claim 1.

6. A light source device comprising:
an exciting light source;
the fluorescent substrate of claim 1; and
a wheel motor for rotating the fluorescent wheel which is the fluorescent substrate.

7. The fluorescent substrate of claim 1, wherein a red fluorescent layer that emits red wavelength band light, a green fluorescent layer that emits green wavelength band light, and a diffusion transmission layer that diffuses light and allows the light to pass therethrough are disposed in order within the ring-like groove of the base which is the fluorescent wheel in a peripheral direction.

8. A light source device comprising:
an exciting light source which is a blue laser beam generator whose optical axis is disposed so as to be perpendicular to the fluorescent substrate; and
the fluorescent substrate of claim 7;
wherein a dichroic mirror which allows emitted light from the exciting light source to pass therethrough and reflects fluorescence from the fluorescent substrate is disposed between the exciting light source and the fluorescent substrate.

9. A projector comprising:
a display element;
the light source device of claim 6;
a light source side optical system that guides light emitted from the light source device to the display element;
a projection side optical system that projects projection light from the display element to a screen; and
a projector controller.

10. A fluorescent substrate comprising:
a base having a reflective surface; and
a fluorescent layer formed by disposing a fluorescent substance on the reflective surface of the base;
wherein fluorescence emitted from the fluorescent substance due to its excitation by exciting light is emitted from a side of the base on which the fluorescent substance is disposed;
wherein the reflective surface of the base has a minute reflective structure formed thereon such that fluorescence emitted in a flat direction of the base from the fluorescent layer is emitted outward, in a direction intersecting the flat direction, from the side of the base on which the fluorescent substance is disposed;
wherein the minute reflective structure comprises a flat section and a plurality of projections projecting from the flat section; and
wherein a height of each projection in the minute reflective structure is equal in value to a thickness of the fluorescent layer from a bottom surface to a top surface of the fluorescent layer.

11. A light source device comprising an exciting light source and the fluorescent substrate of claim 10.

12. A projector comprising:
a display element;
the light source device of claim 11;
a light source side optical system that guides light emitted from the light source device to the display element;
a projection side optical system that projects projection light from the display element to a screen; and
a projector controller.

13. A projector comprising:
a display element;
a light source device,
a light source side optical system that guides light emitted from the light source device to the display element;

a projection side optical system that projects projection light from the display element to a screen; and
a projector controller;
wherein the light source device comprises an exciting light source and a fluorescent substrate; and
wherein the fluorescent substrate comprises:
a base having a reflective surface; and
a fluorescent layer formed by disposing a fluorescent substance on the reflective surface of the base;
wherein fluorescence emitted from the fluorescent substance due to its excitation by exciting light is emitted from a side of the base on which the fluorescent substance is disposed;
wherein the reflective surface of the base has a minute reflective structure formed thereon such that fluorescence emitted in a flat direction of the base from the fluorescent layer is emitted outward, in a direction intersecting the flat direction, from the side of the base on which the fluorescent substance is disposed;
wherein the minute reflective structure comprises a flat section and a plurality of projections projecting from the flat section; and
wherein a height of each projection in the minute reflective structure is smaller in value than a thickness of the fluorescent layer.

14. A fluorescent substrate comprising:
a base having a reflective surface; and
a fluorescent layer formed by disposing a fluorescent substance on the reflective surface of the base;
wherein fluorescence emitted from the fluorescent substance due to its excitation by exciting light is emitted from a side of the base on which the fluorescent substance is disposed;
wherein the reflective surface of the base has a minute reflective structure formed thereon such that fluorescence emitted in a flat direction of the base from the fluorescent layer is emitted outward, in a direction intersecting the flat direction, from the side of the base on which the fluorescent substance is disposed;
wherein the minute reflective structure comprises a flat section and a plurality of projections projecting from the flat section;
wherein the base is a fluorescent wheel which is in the form of a disc, at a predetermined position on which a ring-like groove is formed, wherein the minute reflective structure is formed on a bottom face of the ring-like groove, and wherein the fluorescent layer is deposited within the ring-like groove; and
wherein each of the projections is a paraboloid of revolution.

15. The fluorescent substrate of claim 14, wherein a height of each projection in the minute reflective structure is equal in value to a thickness of the fluorescent layer.

16. The fluorescent substrate of claim 14, wherein a height of each projection in the minute reflective structure is smaller in value than a thickness of the fluorescent layer.

17. The fluorescent substrate of claim 14, wherein a red fluorescent layer that emits red wavelength band light, a green fluorescent layer that emits green wavelength band light, and a blue fluorescent layer that emits blue wavelength band light are disposed in order within the ring-like groove in a peripheral direction.

18. A light source device comprising an exciting light source and the fluorescent substrate of claim 14.

19. A light source device comprising:
an exciting light source;
the fluorescent substrate of claim 14; and
a wheel motor for rotating the fluorescent wheel which is the fluorescent substrate.

20. The fluorescent substrate of claim 14, wherein a red fluorescent layer that emits red wavelength band light, a green fluorescent layer that emits green wavelength band light, and a diffusion transmission layer that diffuses light and allows the light to pass therethrough are disposed in order within the ring-like groove of the base which is the fluorescent wheel in a peripheral direction.

21. A light source device comprising:
an exciting light source which is a blue laser beam generator whose optical axis is disposed so as to be perpendicular to the fluorescent substrate; and
the fluorescent substrate of claim 20;
wherein a dichroic mirror which allows emitted light from the exciting light source to pass therethrough and reflects fluorescence from the fluorescent substrate is disposed between the exciting light source and the fluorescent substrate.

22. A projector comprising:
a display element;
the light source device of claim 19;
a light source side optical system that guides light emitted from the light source device to the display element;
a projection side optical system that projects projection light from the display element to a screen; and
a projector controller.

* * * * *